United States Patent
Roesler et al.

(10) Patent No.: US 6,355,829 B2
(45) Date of Patent: *Mar. 12, 2002

(54) ASPARTATE-TERMINATED UREA/ URETHANE PREPOLYMERS AND THEIR USE IN COATING COMPOSITIONS

(75) Inventors: Richard R. Roesler, Wexford; Lyubov K. Gindin, Pittsburgh; P. Richard Hergenrother, Gibsonia, all of PA (US)

(73) Assignee: Bayer Corporation, Pittsburgh, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/389,686

(22) Filed: Sep. 2, 1999

(51) Int. Cl.$^7$ .................. C07C 225/06; C07C 271/06; C07C 275/06; C07C 275/10; C07C 275/12

(52) U.S. Cl. .................. 560/25; 528/60; 528/61; 528/68; 560/26; 560/115; 560/158; 560/190; 560/204; 560/205; 564/58; 564/59; 564/60

(58) Field of Search ................ 528/60, 61, 68; 560/25, 26, 115, 158, 190, 204, 205; 564/58, 59, 60

(56) References Cited

U.S. PATENT DOCUMENTS

| | | | |
|---|---|---|---|
| 5,126,170 A | | 6/1992 | Zwiener et al. .......... 427/385.5 |
| 5,236,741 A | | 8/1993 | Zwiener et al. .......... 427/385.5 |
| 5,243,012 A | * | 9/1993 | Wicks et al. .................. 528/58 |
| 5,364,955 A | | 11/1994 | Zwiener et al. ............. 556/418 |
| 5,506,327 A | * | 4/1996 | Yonek et al. ................ 528/45 |
| 5,516,873 A | * | 5/1996 | Hicks et al. ................. 528/60 |
| 5,561,200 A | * | 10/1996 | Yonek et al. ................ 528/45 |
| 5,561,211 A | * | 10/1996 | Yonek et al. ................ 528/45 |
| 5,580,945 A | * | 12/1996 | Wade et al. ................. 528/49 |
| 5,596,044 A | * | 1/1997 | Gindin et al. .............. 525/131 |
| 5,597,930 A | | 1/1997 | Wicks et al. ............. 548/314.1 |
| 5,736,604 A | | 4/1998 | Luthra ........................ 524/591 |
| 5,852,203 A | * | 12/1998 | Jonsson et al. .......... 548/314.1 |
| 6,183,870 B1 | * | 2/2001 | Hergenrother et al. ... 428/428.1 |

* cited by examiner

Primary Examiner—Rabon Sergent
(74) Attorney, Agent, or Firm—Joseph C. Gil; Thomas W. Roy

(57) ABSTRACT

The present invention relates to aspartate-terminated urea/urethane prepolymers that are based on the reaction products of NCO prepolymers with compounds corresponding to the formula

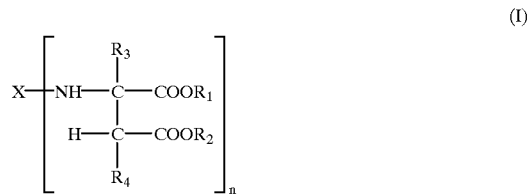

(I)

wherein
  X represents an organic group which has a valency of n and is inert towards isocyanate groups at a temperature of 100° C. or less,
  $R_1$ and $R_2$ may be identical or different and represent organic groups which are inert towards isocyanate groups at a temperature of 100° C. or less,
  $R_3$ and $R_4$ may be identical or different and represent hydrogen or organic groups which are inert towards isocyanate groups at a temperature of 100° C. or less and
  n represents an integer with a value of at least 2,
at an equivalent ratio of aspartate groups to isocyanate groups of 1.5:1 to 20:1.
The present invention also relates to coating compositions containing the aspartate-terminated urea/urethane prepolymers and a polyisocyanate.

12 Claims, No Drawings

ASPARTATE-TERMINATED UREA/URETHANE PREPOLYMERS AND THEIR USE IN COATING COMPOSITIONS

BACKGROUND OF THE INVENTION

1. Field of the Invention

The present invention relates to aspartate-terminated urea/urethane prepolymers and their use in combination with polyisocyanates for the production of coating compositions that have improved flexibility.

2. Description of the Prior Art

The reaction of polyaspartates with polyisocyanates to form polyurea coatings is disclosed in U.S. Pat. Nos. 5,126,170 and 5,236,741. The polyisocyanates are blended with polyaspartates and then reacted after the mixture has been applied to a suitable substrate to form a urea group-containing coating.

One of the deficiencies of these coatings is that they do not possess good flexibility, primarily because both of the reaction components are low molecular weight compounds. The reaction of these components results in a high concentration of urea groups, so-called "hard blocks," which are known to result in rigid coatings.

One possibility for increasing the flexibility of the coatings is to blend the polyaspartates with the known high molecular weight polyols. However, when these systems are cured the coatings obtained have a waxy feel, which makes them unsuitable for commercial applications. It is believed that this is caused by the fact that aspartate groups react with isocyanate groups much faster than hydroxy groups. Therefore, during the curing process the polyisocyanates react with the aspartates, which hardens the coatings to such an extent that the isocyanate groups cannot react with the hydroxy groups of the polyol component. The polyols remain in the cured coating as a plasticizer resulting in a waxy feel.

One method of overcoming this difficulty is to prereact the polyol with the polyisocyanate to form an NCO prepolymer. The prepolymer can then be reacted with the polyaspartate to form a fully cured coating composition. One disadvantage of this process is that unreacted monomeric polyisocyanate is also present in the NCO prepolymer. To remove this free monomer, which is necessary for environmental reasons, requires an expensive stripping process.

Accordingly, it is an object of the present invention to improve the flexibility of coatings prepared from polyisocyanates and polyaspartates, while avoiding the high production costs associated with prior art processes.

These objects can be achieved with the aspartate-terminated urea/urethane prepolymers according to the present invention that are described hereinafter. These prepolymers can be combined with polyisocyanates to prepare solvent-containing or solvent-free coating compositions that may be cured to provide coatings with improved flexibility.

U.S. Pat. No. 5,397,930 is directed to aspartate-terminated hydantoin prepolymers that are prepared by reacting an excess of diaspartates with diisocyanates to form urea group-containing prepolymers and subsequently converting the urea groups to hydantoin groups. The prepolymers of the U.S. patent do not contain urethane groups. To the contrary the aspartate-terminated prepolymers of the present invention are prepared by reacting urethane group-containing NCO prepolymers with an excess of diaspartates.

SUMMARY OF THE INVENTION

The present invention relates to aspartate-terminated urea/urethane prepolymers that are based on the reaction products of NCO prepolymers with compounds corresponding to the formula

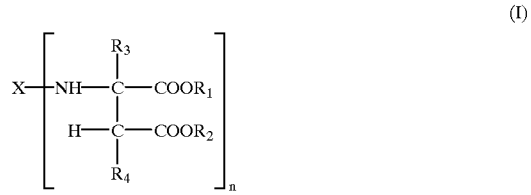

wherein
X represents an organic group which has a valency of n and is inert towards isocyanate groups at a temperature of 100° C. or less, $R_1$ and $R_2$ may be identical or different and represent organic groups which are inert towards isocyanate groups at a temperature of 100° C. or less, $R_3$ and $R_4$ may be identical or different and represent hydrogen or organic groups which are inert towards isocyanate groups at a temperature of 100° C. or less and n represents an integer with a value of at least 2, at an equivalent ratio of aspartate groups to isocyanate groups of 1.5:1 to 20:1.

The present invention also relates to coating compositions containing the aspartate-terminated urea/urethane prepolymers and a polyisocyanate.

DETAILED DESCRIPTION OF THE INVENTION

In accordance with the present invention the term "urea/urethane prepolymers" refers to polymers containing urea groups and urethane groups. The aspartate-terminated urea/urethane prepolymers may be prepared by reacting NCO prepolymers with an excess amount of a polyaspartate. The NCO prepolymers are prepared by reacting a monomeric polyisocyanate or a polyisocyanate adduct, preferably a monomeric diisocyanate, with a high molecular weight polyol, and optionally a low molecular weight alcohol. The NCO prepolymers have an average functionality of 1.5 to 3.5, preferably 1.8 to 2.2, more preferably 2.

Suitable monomeric diisocyanates may be represented by the formula $$R(NCO)_2$$

wherein R represents an organic group obtained by removing the isocyanate groups from an organic diisocyanate having a molecular weight of from about 112 to 1,000, preferably from about 140 to 400. Preferred diisocyanates are those in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanato-cyclohexyl)- methane, 1,3- and 1,4-bis-(isocyanatomethyl)-cyclohexane, bis-(4-isocyanatocyclohexyl)-methane, 2,4'-diisocyanato-dicyclohexyl methane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydro-toluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene and mixtures thereof.

Monomeric polyisocyanates containing 3 or more isocyanate groups such as 4-isocyanatomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates may also be used.

Preferred organic diisocyanates include 1,6-hexamethylene diisocyanate, 1-isocyanato-3-isocyanatomethyl-3,5,5-trimethyl-cyclohexane (isophorone diisocyanate or IPDI), bis-(4-isocyanato-cyclohexyl)-methane, 1-isocyanato-1-methyl-4(3)-isocyanatomethyl cyclohexane, 2,4- and/or 2,6-toluylene diisocyanate, and 2,4- and/or 4,4'-diphenyl-methane diisocyanate. 1,6-hexamethylene diisocyanate is most preferred.

In accordance with the present invention the polyisocyanate component may also be in the form of a polyisocyanate adduct. Suitable polyisocyanate adducts are those containing isocyanurate, uretdione, biuret, urethane, allophanate, iminooxadiazine dione, carbodiimide and/or oxadiazinetrione groups. The polyisocyanates adducts, which preferably have an NCO content of 5 to 30% by weight, include:

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a suitable catalyst, e.g., a trialkyl phosphine catalyst, and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos 5,124,427, 5,208,334 and 5,235,018, the disclosures of which are herein incorporated by reference, preferably polyisocyanates containing these groups in a ratio of monoisocyanurate groups to mono-allophanate groups of about 10:1 to 1:10, preferably about 5:1 to 1:7.

7) Iminooxadiazine dione and optionally isocyanurate group-containing polyisocyanates which may be prepared in the presence of special fluorine-containing catalysts as described in DE-A 19611849. These polyisocyanates generally have an average NCO functionality of 3 to 3.5 and an NCO content of 5 to 30%, preferably 10 to 25% and most preferably 15 to 25% by weight.

8) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

9) Polyisocyanates containing oxadiazinetrione groups and containing the reaction product of two moles of a diisocyanate and one mole of carbon dioxide.

Preferred polyisocyanate adducts are the polyisocyanates containing isocyanurate, uretdione, biuret, iminooxadiazine dione and/or allophanate groups.

Suitable isocyanate-reactive components for preparing the NCO prepolymers include organic compounds containing at least two hydroxy groups. These organic compounds include high molecular weight polyols having molecular weights of 500 to about 10,000, preferably 800 to about 6,000, and more preferably 800 to 3,500, and optionally low molecular weight alcohols having molecular weights below 500. The molecular weights are number average molecular weights ($M_n$) and are determined by end group analysis (OH number). Products obtained by reacting polyisocyanates exclusively with low molecular weight compounds are polyisocyanates adducts containing urethane groups and are not considered to be NCO prepolymers.

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred, especially the polyether polyols.

Examples of suitable high molecular weight polyhydroxyl compounds include polyester polyols prepared from low molecular weight alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Polylactones having hydroxyl groups, particularly poly-e-caprolactone, are also suitable for producing the prepolymers.

Also suitable for preparing the prepolymers are polyether polyols, which may be obtained in known manner by the alkoxylation of suitable starter molecules. Examples of suitable starter molecules include polyols, water, organic polyamines having at least two N—H bonds and mixtures thereof. Suitable alkylene oxides for the alkoxylation reaction are preferably ethylene oxide, propylene oxide and/or tetrahydrofuran, which may be used in sequence or in admixture. Tetrahydrofuran is most preferred.

Other suitable polyols include polycarbonates having hydroxyl groups, which may be produced by the reaction of diols with phosgene or diaryl carbonates such as diphenyl carbonate.

Further details concerning the low molecular weight compounds and the starting materials and methods for preparing the high molecular weight polyhydroxy compounds are disclosed in U.S. Pat. No. 4,701,480, herein incorporated by reference.

The NCO prepolymers preferably have an isocyanate content of 0.3 to 35% by weight, more preferably 0.6 to 25% by weight and most preferably 1.2 to 20% by weight. The NCO prepolymers are produced by reacting the polyisocyanates, preferably monomeric diisocyanates, with the polyol component at a temperature of 40 to 120° C., preferably 50 to 100° C., at an NCO/OH equivalent ratio of 1.3:1 to 20:1, preferably 1.4:1 to 10:1. If chain extension via urethane groups is desired during the preparation of the isocyanate prepolymers, an NCO/OH equivalent ratio of 1.3:1 to 2:1 is selected. If chain extension is not desired, an excess of diisocyanate is preferably used, corresponding to an NCO/OH equivalent ratio of 4:1 to 20:1, preferably 5:1 to 10:1. The excess diisocyanate may optionally be removed by thin layer distillation when the reaction is completed. In accordance with the present invention NCO prepolymers also include NCO semi-prepolymers which contain unreacted starting polyisocyanates in addition to the urethane group-containing prepolymers.

To prepare the aspartate-terminated prepolymers, the previously described NCO prepolymers are reacted with compounds corresponding to formula I:

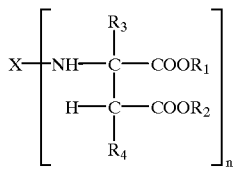

(I)

wherein
- X represents an organic group which has a valency of n and is inert towards isocyanate groups at a temperature of 100° C. or less, preferably an n-valent hydrocarbon group obtained by removing the amino groups from an aliphatic, araliphatic or cycloaliphatic polyamine, more preferably a diamine and most preferably a linear or branched aliphatic diamine,
- $R_1$ and $R_2$ are identical or different and represent organic groups which are inert to isocyanate groups at a temperature of 100° C. or less, preferably alkyl groups having 1 to 9 carbon atoms, more preferably methyl, ethyl or butyl groups
- $R_3$ and $R_4$ may be identical or different and represent hydrogen or organic groups which are inert towards isocyanate groups at a temperature of 100° C. or less, preferably hydrogen and
- n represents an integer with a value of at least 2, preferably 2 to 4 and more preferably 2.

With regard to preceding definitions $R_1$ and $R_2$ may be different when the polyaspartates are prepared from mixed maleates, such as methylethyl maleate. In addition, one $R_1$ may be different from another $R_1$. For example, when a mixture of maleates, e.g. dimethyl and diethyl maleate, is used to prepare the polyaspartate, one pair of $R_1$ and $R_2$ groups will be methyl and the other will be ethyl.

The polyaspartates may be prepared in known manner as described in U.S. Pat. No. 5,126,170, herein incorporated by reference by reacting the corresponding primary polyamines corresponding to the formula

(II)

with optionally substituted maleic or fumaric acid esters corresponding to the formula

(III)

Suitable polyamines include ethylene diamine, 1,2-diamino-propane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclo-hexane, 2,4- and/or 2,6-hexahydrotoluylene diamine, 2,4'- and/or 4,4'-diamino-dicyclohexyl methane and 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane.

Preferred are 1,4-diaminobutane, 1,6-diaminohexane, 2-methyl-1,5-pentane diamine, 2,2,4- and 2,4,4-trimethyl-1,6-diamino-hexane, 1,3- and/or 1,4-cyclohexane diamine, 1-amino-3,3,5-trimethyl-5-aminomethyl-cyclohexane, 2,4- and/or 2,6-hexahydrotoluylene diamine, 4,4'-diamino-dicyclohexyl methane, 3,3-dimethyl-4,4'-diamino-dicyclohexyl methane and 3,3-diethyl-4,4'-diamino-dicyclohexyl methane. Most preferred are 1,6-diaminohexane and 2-methyl-1,5-pentane diamine.

Also suitable, though less preferred, are the aromatic polyamines such as 2,4- and/or 2,6-diaminotoluene and 2,4'- and/or 4,4'-diaminodiphenyl methane. Relatively high molecular weight polyether polyamines containing aliphatically bound primary amino groups, for example, the products marketed under the Jeffamine trademark by Texaco, are also suitable.

Examples of optionally substituted maleic or fumaric acid esters suitable for use in the preparation of the compounds corresponding to formula I include dimethyl, diethyl and di-n-butyl esters of maleic acid and fumaric acid, the previously discussed mixed maleates and fumarates, and the corresponding maleic or fumaric acid esters substituted by methyl in the 2- and/or 3-position.

The aspartate-terminated urea/urethane prepolymers according to the invention are prepared by reacting the NCO prepolymers with the polyaspartates at an equivalent ratio of aspartate groups (i.e., secondary amino groups) to isocyanate groups of 1.5:1 to 20:1, preferably 2:1 to 20:1 and more preferably 3:1 to 20:1. The reaction is preferably carried out by incrementally adding the polyisocyanate to the polyaspartate. After the reaction any excess polyaspartates remain in the aspartate-terminated prepolymers and function as a reactive diluent. Also during the reaction the presence of excess polyaspartate reduces the formation of higher molecular weight oligomers.

At low reaction temperatures of 10 to 100° C., preferably 20 to 80° C. and more preferably 20 to 50° C., the aspartate groups react with isocyanate groups to form urea groups. The urea groups may be converted to hydantoin groups in known manner either by heating the compounds at elevated temperatures, optionally in the presence of an acidic or basic catalyst, or after storage under ambient conditions. Therefore, the term "urea groups" is also intended to include other compounds containing the group, N—CO—N, such as hydantoin groups.

The conversion of urea groups to hydantoin groups is accelerated at temperatures of 60 to 240° C., preferably 80 to 160° C. and more preferably 100 to 140° C. The hydantoin groups are formed with the elimination of a monoalcohol. Instead of forming the urea groups and hydantoin groups in two steps, the reaction may be carried out entirely at elevated temperatures in order to form the urea groups and hydantoin groups in one step.

In accordance with the present invention it is preferred to convert urea groups to hydantoin groups at elevated temperatures before the aspartate-terminated prepolymer is mixed with a polyisocyanate. Under these conditions the monoalcohol may be removed from the prepolymer, which prevents it from reacting with polyisocyanates that are subsequently added.

The aspartate-terminated urea/urethane prepolymers may be used in combination with the previously described monomeric polyisocyanates or polyisocyanate adducts, preferably polyisocyanate adducts, to form two-component coating compositions. When used as a co-reactant the polyisocyanate adducts may have an average functionality of 1.5 to 6, preferably 1.8 to 6, more preferably 2 to 6 and most preferably 2 to 4. The aspartate-terminated prepolymers are mixed with the polyisocyanates in amounts sufficient to provide an equivalent ratio of aspartate groups to isocyanate groups of 1.2:1 to 1:3, preferably 1.1:1 to 1:2 and more preferably 1.1:1.0 to 1.0:1.1.

The coating compositions are prepared by mixing the individual components together. Preparation of the binders is carried out solvent-free or in the presence of the solvents conventionally used in polyurethane or polyurea coatings. It is an advantage of the process according to the invention that the quantity of solvent used may be greatly reduced when compared with that required in conventional two-component systems.

Examples of suitable solvents include xylene, butyl acetate, methyl isobutyl ketone, methoxypropyl acetate, N-methyl pyrrolidone, Solvesso solvent, petroleum hydrocarbons, iso-butanol, butyl glycol, chlorobenzenes and mixtures of such solvents.

In the coating compositions to be used for the process according to the invention, the ratio by weight of the total quantity of binder components a) and b) to the quantity of solvent is about 40:60 to 100:0, preferably about 60:40 to 100:0.

The coating compositions to be used for the process according to the invention may also contain other auxiliary agents and additives conventionally used in polyurethane and polyurea coatings, in particular pigments, fillers, catalysts, leveling agents, antisettling agents, UV stabilizers and the like. Coating compositions containing pigments and/or fillers are especially suitable for the present invention due to the difficulty of removing all of the moisture from these additives.

For carrying out the process according to the invention, the coating compositions to be used according to the invention are applied as one or more layers to substrates by known methods such as spraying, brush coating, immersion or flooding or by means of rollers or doctor applicators. The process according to the invention is suitable for the formation of coatings on various substrates, e.g., metals, plastics, wood, cement, concrete or glass. The process according to the invention is particularly suitable for the formation of coatings on sheet steel, for example, for the manufacture of car bodies, machine trim panels, vats or containers. The substrates to be coated by the process according to the invention may be treated with suitable primers before the process according to the invention is carried out.

After the substrates exemplified above have been coated, the coatings may be cured at either ambient temperature, e.g., by air drying or so-called forced drying, or at elevated temperature.

The invention is further illustrated but is not intended to be limited by the following examples in which all parts and percentages are by weight unless otherwise specified.

EXAMPLES

Polyether 1

A polytetramethylene ether glycol having number average molecular weight of 1000 (available from DuPont as Terethane 1000).

Polyether 2

A polypropylene oxide glycol having a number average molecular weight of 2000 (available from Bayer Corporation as Desmophen 1900U).

Polyester 1

A polyester having an OH number of 51 and an average functionality of 2 and prepared from 3 moles of pentaerythritol, two moles of adipic acid and 6 moles of oleic acid.

Polyisocyanate 1

An isocyanurate group-containing polyisocyanate prepared from 1,6-hexamethylene diisocyanate and having an isocyanate content of 21.6%, a content of monomeric diisocyanate of <0.2% and a viscosity at 20° C. of 3000 mPa·s (available from Bayer Corporation as Desmodur N 3300).

Diaspartate 1

A diaspartate prepared from 2-methyl-1,5-pentane diamine and diethyl maleate (having an NH number of 244, an equivalent weight of 230 and a viscosity of 70 mP·s @ 25° C., available from Bayer Corp. as Desmophen NH 1220).

NCO Prepolymer 1

43.8 g (0.52 eq) of HDI were introduced into a round bottom flask fitted with stirrer, heater, nitrogen inlet, addition funnel and thermocouple. The temperature was raised to 60° C. and then a mixture of 143.1 g (0.13 eq) of Polyester 1 and 63.1 g (0.13 eq) Polyether 1 was added via the addition funnel over a one hour period. The reaction was continued for an additional hour at 60° C. and held at room temperature for three days. The theoretical NCO content was 4.37%.

Aspartate-terminated Prepolymer 1

122.4 g (0.53 eq) of Diaspartate 1 were introduced into a round bottom flask fitted with stirrer, heater, nitrogen inlet, addition funnel and thermocouple. 127.5 g (0.133 eq) of NCO Prepolymer I was added via the addition funnel over a one hour period. The temperature was raised to 60° C. and the reaction was continued for an additional five hours at this temperature. The resulting product was a 64:36 mixture of the aspartate-terminated prepolymer and excess diaspartate, and had an amine number of 87.4 and a viscosity of 5300 mP·s @ 25° C.

NCO Prepolymer 2

39.8 g (0.47 eq) of HDI were introduced into a round bottom flask fitted with stirrer, heater, nitrogen inlet, addition funnel and thermocouple. The temperature was raised to 60° C. and then a mixture of 260.3 g (0.237 eq) of Polyester 1 were added via the addition funnel over a one hour period. The reaction was continued for an additional hour at 60° C. and held at room temperature for three days. The theoretical NCO content was 3.29%.

Aspartate-terminated Prepolymer 2

145.0 g (0.63 eq) of Diaspartate 1 were introduced into a round bottom flask fitted with stirrer, heater, nitrogen inlet, addition funnel and thermocouple. 200.0 g (0.157 eq) of NCO Prepolymer 2 was added via the addition funnel over a one hour period. The temperature was raised to 60° C. and the reaction was continued for an additional five hours this temperature. The resulting product was a 68:32 mixture of the aspartate-terminated prepolymer and excess diaspartate, and had an amine number of 81.3 and a viscosity of 1630 mP·s @ 25° C.

NCO Prepolymer 3

64.3 g (0.765 eq) of HDI were introduced into a round bottom flask fitted with stirrer, heater, nitrogen inlet, addition funnel and thermocouple. The temperature was raised to 60° C. and then a mixture of 187.5 g (0.387 eq) of Polyether 1 was added via the addition funnel over a one hour period. The reaction was continued for an additional hour at 60° C. and held at room temperature for three days. The theoretical NCO content was 6.45%.

Aspartate-terminated Prepolymer 3

146.2 g (0.64 eq) of Diaspartate 1 were introduced into a round bottom flask fitted with stirrer, heater, nitrogen inlet, addition funnel and thermocouple. 103.8 g (0.160 eq) of NCO Prepolymer 3 were added via the addition funnel over a one hour period. The temperature was raised to 60° C. and the reaction was continued for an additional five hours at this temperature. The resulting product was a 56:44 mixture of the aspartate-terminated prepolymer and excess diaspartate, and had an amine number of 105.9 and a viscosity of 11,100 mP·s @ 25° C.

NCO Prepolymer 4

43.2 g (0.514 eq) of HDI were introduced into a round bottom flask fitted with stirrer, heater, nitrogen inlet, addition funnel and thermocouple. The temperature was raised to 60° C. and then a mixture of 256.8 g (0.257 eq) Polyether 2 were added via the addition funnel over a one hour period. The reaction was continued for an additional hour at 60° C. and held at room temperature for three days. The theoretical NCO content was 3.60%.

Aspartate-terminated Prepolymer 4

157.0 g (0.64 eq) of Diaspartate 1 were introduced into a round bottom flask fitted with stirrer, heater, nitrogen inlet, addition funnel and thermocouple. 200.0 g (0.171 eq) of NCO Prepolymer 4 were added via the addition funnel over a one hour period. The temperature was raised to 60° C. and the reaction was continued for an additional five hours at this temperature. The resulting product was a 67:33 mixture of the aspartate-terminated prepolymer and excess diaspartate, and had an amine number of 80.9 and a viscosity of 10,300 mP·s @ 25° C.

Preparation of samples for testing Shore hardness, tensile properties and gel times Approximately forty grams of the aspartate resins set forth in the following table were weighed into a plastic cup. Polyisocyanate 1 was added in an amount sufficient to provide an equivalent ratio of isocyanate groups to aspartate groups of 1.05:1. The two materials were vigorously stirred for 15 seconds and then one half the mixture was poured into an aluminum-weighing dish. The other half was poured onto a glass plate. A film was made on the glass plate by drawing out a thin film with a 15 mil draw down bar. Both the glass panel and the weighing dish were allowed to cure for 21 days at 25° C. and 50% R.H. Gel times were recorded when the mixture solidified as determined by touching with a wooden probe.

Durometer Shore hardness readings were performed on the polymer in the weighing dish according to ASTM D 2240.

When the curing period was complete, the glass panels were immersed in tap water for about two hours. The film was lifted from the glass surface, patted dry with a paper towel and dusted with talc to prevent the polymers from sticking to themselves or other surfaces. The free films were stacked alternately with paper towels and allowed to dry overnight. Tensile and elongation were then determined. Tensile strength and percent elongation were determined on free films according to ASTM D 412.

Table of Data

The following table is divided into three sections. The first section shows the weight ratio of the aspartate resins used to prepare the cured specimens. The second sections sets forth the actual weight ratio of diasparate to aspartate-terminated prepolymer. The third sections shows the results of the various performance tests.

| Ingredients | | Effective wt. ratio | | Performance Properties | | | | |
|---|---|---|---|---|---|---|---|---|
| Diasp 1 | Aspartate prep/Amt | Diasp 1 | Aspartate prep | Gel Time (min) | Shore A | Shore D | Tensile | elongation (%) |
| 0 | 1/100 | 36 | 64 | 1 | 62 | 8 | 1339 | 92 |
| 50 | 1/50 | 68 | 32 | 0.8 | 100 | 46 | 1940 | 56 |
| 75 | 1/25 | 84 | 16 | 0.9 | 100 | 68 | 3490 | 16 |
| 90 | 1/10 | 93.6 | 6.4 | 1 | 96 | 76 | 6210 | 4 |
| 100 | 1/0 | 100 | 0 | 1.25 | 100 | 85 | 8650 | 3 |
| 0 | 2/100 | 32 | 68 | 2.25 | 33 | 2 | * | * |
| 50 | 2/50 | 66 | 34 | 1.2 | 97 | 45 | 1860 | 28 |
| 75 | 2/25 | 83 | 17 | 1 | 100 | 67 | 3950 | 8 |
| 90 | 2/10 | 93.2 | 6.8 | 1 | 100 | 74 | 6950 | 4 |
| 100 | 2/0 | 100 | 0 | 1 | 100 | 85 | 8650 | 3 |
| 0 | 3/10 | 44 | 56 | 3.25 | 92 | 42 | 2026 | 74 |
| 50 | 3/50 | 72 | 28 | 0.9 | 100 | 64 | 2390 | 55 |
| 75 | 3/25 | 86 | 75 | 0.9 | 100 | 66 | 4390 | 13 |
| 90 | 3/10 | 94 | 6 | 0.9 | 100 | 80 | 7140 | 4 |
| 100 | 3/0 | 100 | 0 | 1.25 | 100 | 85 | 8650 | 3 |
| 0 | 4/100 | 33 | 67 | 0.75 | 67 | 15 | 1112 | 113 |
| 50 | 4/50 | 66.5 | 33.5 | 6. | 95 | 43 | 1850 | 60 |
| 75 | 4/25 | 83.25 | 16.75 | 7 | 100 | 67 | 4220 | 5 |
| 90 | 4/10 | 93.3 | 6.7 | 11 | 100 | 77 | 5900 | 4 |
| 100 | 4/0 | 100 | 0 | 1.25 | 100 | 85 | 8650 | 3 |

* - waxy did not completely cure, could not be tested

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aspartate-terminated urea/urethane prepolymer that is suitable for use in a two-component coating composition and comprises the reaction product of an NCO prepolymer with a compound corresponding to the formula

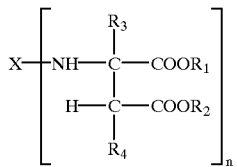

(I)

wherein
X represents the linear or branched aliphatic group obtained by removing the amino groups from a linear or branched aliphatic diamine,
$R_1$ and $R_2$ are identical or different and represent organic groups which are inert towards isocyanate groups at a temperature of 100° C. or less,
$R_3$ and $R_4$ are identical or different and represent hydrogen or organic groups which are inert towards isocyanate groups at a temperature of 100° C. or less and
n represents an integer with a value of at least 2,
at an equivalent ratio of aspartate groups to isocyanate groups of 3:1 to 20:1.

2. The prepolymer of claim 1 wherein X represents the group obtained by removing the amino groups from 1,4-diaminobutane, 1,6-diaminohexane, 2-methyl-1,5-pentane diamine, 2,2,4- and 2,4,4-trimethyl-1,6-diamino-hexane, 1,3-cyclohexane diamine, 1,4-cyclohexane diamine, 1-amino-3,3,5-trimethyl-5-aminomethyl-cyclohexane, 2,4-hexahydrotoluylene diamine, 2,6-hexahydrotoluylene diamine, 4,4'-diamino-dicyclohexyl methane, 3,3-dimethyl-4,4'-diamino-dicyclohexyl-methane or 3,3-diethyl-4,4'-diamino-dicyclohexyl methane.

3. The prepolymer of claim 1 wherein X represents the group obtained by removing the amino groups from 1,6-diaminohexane or 2-methyl-1,5-pentane diamine.

4. The prepolymer of claim 1 wherein said NCO prepolymer has an average functionality of 1.8 to 2.2 and comprises the reaction product of an aliphatic diisocyanate with a polyether diol.

5. The prepolymer of claim 4 wherein X represents the group obtained by removing the amino groups from 1,4-diaminobutane, 1,6-diaminohexane, 2-methyl-1,5-pentane diamine, 2,2,4- and 2,4,4-trimethyl-1,6-diamino-hexane, 1,3-cyclohexane diamine, 1,4-cyclohexane diamine, 1-amino-3,3,5-trimethyl-5-aminomethyl-cyclohexane, 2,4-hexahydrotoluylene diamine, 2,6-hexahydrotoluylene diamine, 4,4'-diamino-dicyclohexyl methane, 3,3-dimethyl-4,4'-diamino-dicyclohexyl methane or 3,3-diethyl-4,4'-diamino-dicyclohexyl methane.

6. The prepolymer of claim 4 wherein X represents the group obtained by removing the amino groups from 1,6-diaminohexane or 2-methyl-1,5-pentane diamine.

7. The prepolymer of claim 1 wherein $R_1$ and $R_2$ represent a methyl, ethyl or butyl group, $R_3$ and $R_4$ represent hydrogen and n is 2.

8. The prepolymer of claim 7 wherein X represents the group obtained by removing the amino groups from 1,4-diaminobutane, 1,6-diaminohexane, 2-methyl-1,5-pentane diamine, 2,2,4- and 2,4,4-trimethyl-1,6-diamino-hexane, 1,3-cyclohexane diamine, 1,4-cyclohexane diamine, 1-amino-3,3,5-trimethyl-5-aminomethyl-cyclohexane, 2,4-hexahydrotoluylene diamine, 2,6-hexahydrotoluylene diamine, 4,4'-diamino-dicyclohexyl methane, 3,3-dimethyl-4,4'-diamino-dicyclohexyl methane or 3,3-diethyl-4,4'-diamino-dicyclohexyl methane.

9. The prepolymer of claim 7 wherein X represents the group obtained by removing the amino groups from 1,6-diaminohexane or 2-methyl-1,5-pentane diamine.

10. The prepolymer of claim 7 wherein said NCO prepolymer has an average functionality of 1.8 to 2.2 and comprises the reaction product of an aliphatic diisocyanate with a polyether diol.

11. The prepolymer of claim 10 wherein X represents the group obtained by removing the amino groups from 1,4-diaminobutane, 1,6-diaminohexane, 2-methyl-1,5-pentane diamine, 2,2,4- and 2,4,4-trimethyl-1,6-diamino-hexane, 1,3-cyclohexane diamine, 1,4-cyclohexane diamine, 1-amino-3,3,5-trimethyl-5-aminomethyl-cyclohexane, 2,4-hexahydrotoluylene diamine, 2,6-hexahydrotoluylene diamine, 4,4'-diamino-dicyclohexyl methane, 3,3-dimethyl-4,4'-diamino-dicyclohexyl methane or 3,3-diethyl-4,4'-diamino-dicyclohexyl methane.

12. The prepolymer of claim 10 wherein X represents the group obtained by removing the amino groups from 1,6-diaminohexane or 2-methyl-1,5-pentane diamine.

* * * * *